United States Patent [19]

D'Agrosa

[11] Patent Number: 4,740,157
[45] Date of Patent: Apr. 26, 1988

[54] METHOD OF CALCINING SOLID MATERIALS AND SINGLE COLUMN KILN THEREFOR

[76] Inventor: David D. D'Agrosa, Boulevard de la Luz No. 209, Mexico, D.F., 01900, Mexico

[21] Appl. No.: 865,540

[22] Filed: May 20, 1986

[51] Int. Cl.⁴ .............................................. F27B 15/10
[52] U.S. Cl. .......................................... 432/14; 432/99
[58] Field of Search ....................... 432/14, 52, 54, 99

[56] References Cited

U.S. PATENT DOCUMENTS

| | | | |
|---|---|---|---|
| 2,597,585 | 5/1952 | Howard | 432/99 |
| 3,142,480 | 7/1964 | Azbe | 432/99 |
| 3,285,590 | 11/1966 | Parsons | 432/99 |
| 3,954,390 | 5/1976 | Akhundou et al. | 432/14 |
| 3,958,919 | 5/1976 | Kjell-Berger | 432/99 |
| 4,431,407 | 2/1984 | Beckenbach et al. | 432/99 |
| 4,473,352 | 9/1984 | Sonoda et al. | 432/99 |

Primary Examiner—Henry C. Yuen
Attorney, Agent, or Firm—McGlew and Tuttle

[57] ABSTRACT

Solid materials are efficiently calcined in a single column kiln by effecting said calcination through a plurality of vertically arranged zones, by means of a method comprising the steps of feeding said solid materials to a preheating zone wherein the materials are preheated countercurrently with combustion gases, allowing said preheated materials to fall to an air preheating zone to which primary air is fed in parallel flow with said falling preheated materials, allowing said materials to fall to a calcining zone to which fuel is admitted in parallel flow with said preheated air, allowing the thus calcined materials to fall to a cooling zone to which secondary cold air is fed countercurrently with said falling materials, exhausting the combustion gases produced in the calcining zone together with said secondary air which was preheated by the calcined materials, at a point between said calcining and cooling zones, and feeding said combustion gases and secondary air as a mixture to the preheating zone. The kiln comprises a vertical elongated receptacle divided by partition means into an upper or preheating chamber and a lower chamber which includes said primary air preheating zone, said calcining zone and said cooling zone, material feed means at the top of said upper chamber, material transfer means between said upper and said lower chambers, and material discharge means at the bottom of said lower chamber.

7 Claims, 2 Drawing Sheets

METHOD OF CALCINING SOLID MATERIALS AND SINGLE COLUMN KILN THEREFOR

FIELD OF THE INVENTION

The present invention refers to a method of calcining solid materials and to a single column kiln to carry out the same and, more particularly, it is related to a calcining process effected in a single column kiln, particularly applicable to the calcination of limestone for the manufacture of lime, as well as to a single column kiln specifically designed to carry out the process.

BACKGROUND OF THE INVENTION

Several varieties of kilns are known in the prior art for the calcination of limestone and dolomite, to manufacture lime or magnesite, respectively, said kilns carrying out the calcining process by many different procedural steps, and vary from mere cupola furnaces wherein the limestone or the dolomite are calcined by means of the countercurrent passage, with respect to a granulated material column, of combustion gases at a temperature sufficient to accomplish such a calcination, up to highly efficient kilns producing a first quality and very uniform material, as well as capable of recovering most of the waste heat which escapes with the exhaust gases in the calcining process.

The primitive cupola furnaces, however, have left must to desire because the efficiency of the process is so low that, given the low price of the materials normally calcined by means of said furnaces, which renders it impossible to permit increases in the costs and low efficiency in the kiln for carrying out said processes, they have not been capable of permitting an economical operation and, consequently, such primitive furnaces or kilns have been practically disregarded and have been displaced from the market by more efficient kilns.

The known kilns for carrying out strongly endothermic processes, such as melting furnaces, kilns for the degasification of carbonates, kilns for the calcination of limestone and dolomite, and the like, such as is well known in the prior art, have suffered of a very low thermal efficiency, due to the large waste of heat in the exhaust gases. Said losses have been higher, the higher the excess amounts of air used are in the kilns of this type, and the thermal efficiency is very low regardless of the type of fuel utilized, either liquid, solid or gaseous.

The reasons for the thermal losses in the prior art kilns to carry out endothermic processes of this type, resides on the waste of burned gases which are exhausted from the reaction zone, in which the actual combustion is effected at very high temperatures, thereby carrying out enormous amounts of heat that the material in the preheating zone does not absorb in a sufficient manner, due to the fact that the temperature differentials are not sufficiently high to transfer reasonable amounts of heat from said combustion gases to the material.

This is particularly serious when dealing with heat sensitive material such as limestone or dolomite, wherein the necessarily low temperatures for the reaction can be maintained only with great excess of air or by means of the addition of large amounts of inert gases, for instance, kiln exhaust gases, which still increases to a larger extent the amounts of heat which are carried by the gases leaving the reaction zone, thereby additionally reducing the efficiency of combustion in the process, with the resulting high temperatures of the exhaust gases.

In order to overcome such large heat losses, processes have been suggested wherein, between a reaction zone and a material preheating zone, waste gases are extracted and reintroduced in the reaction zone in a suitable point, either alone or in the presence of cold air. While in this manner the heat losses are considerably reduced, there is the inconveniency that the bypass for these gases normally tends to loose heat through radiation, whereby a very good installation is required, thus increasing the costs of production, and also this method cannot reduce the losses in the waste gases resulting from the use of the necessary excess of air in the combustion of the fuel.

In order to overcome these disadvantages a double column kiln was designed to carry out the endothermic processes of the above described nature, said kiln being suitable for instance for the production of lime and said process being carried out in a double column kiln in which the material to be calcined is preheated in a first column by the countercurrent passage of combustion gases leaving the reaction zone of the second column in an intermediate position between said columns, whereas in the second column fuel and primary combustion air are introduced, which primary air is preheated by the previously preheated material in said column, and burns the fuel in order to effect the calcination, at the same time injecting cold air at the lower end of said second column in order to pass said cold secondary air, jointly with the combustion gases, to the first column to preheat in a countercurrent contact the material which descends through the same. After a predetermined period which is generally of from 10 to 20 minutes, the flow to the columns is reversed and then the first column acts as a calcining column whereas the second column acts as a preheating column. As at the lower portions of said column only cold air is circulated, both columns in this zone constitute cooling zones for the material which is being calcined, which material is discharged after cooling from the bottom of said column, although in an alternated manner, that is, first from one column and thereafter from the other column.

Although the thermal efficiency of this type of kilns is high and the quality of the thus obtained material is uniform and also high, said kiln present the serious drawback that the operation of the kiln is extremely intricate and requires flow reversing installations, as well as due attention from the generators or automatic controls which may be susceptible to damage, inasmuch as the process must be reversed within very accurate and predetermined periods of time, with the consequent cumbersome actions and, if a careless operation is effected, the devices built in accordance with this technique very probably will malfunction.

The great advantage contributed by the prior art double column kiln and process described above, which is particularly described and claimed in U.S. Pat. No. 3,074,706 patented Jan. 22, 1963 to Schmid et al, is that for a first time a zone for preheating the material is introduced, which is absolutely separated from the reaction zone, whereby an effective preheating of the material is accomplished, as well as a good reaction of the previously preheated material, which increase the efficiency of the reaction. However, the separation of these two zones, namely, the preheating and the reaction zone, by the use of two parallel and separate columns, presents serious drawbacks as to its operation and complicates the process in a manner such that the production costs are considerably increased.

Therefore for long the workers in this art have sought to design a kiln which, without the need of having to reverse the flow for alternating preheating and reacting in the two separate zones described above, may accomplish the separation of the preheating zone with respect to the reaction zone in an efficient manner, but without presenting the drawbacks of the prior art kilns and processes. Up to the present date, however, said task has not been accomplished, because the only method and the only kiln existing up to the present date to carry out the preheating and the reaction in totally separated zones, is the one described and claimed in the above mentioned U.S. Pat. No. 3,074,706 to A. Schmid et al, which constitutes up to the present time the most popular and commercially used kiln, as may be proven by the kilns that are being installed in most of the world by the Kennedy Van Saun Corporation, with its kiln MCV (Multi Column Vertical) which is denominated multiple column vertical kiln, and which is a two column, parallel flow regenerative kiln such as described above.

OBJECTS OF THE INVENTION

Having in mind the defects of the prior art calcining kilns and processes, it is an object to the present invention to provide a method of calcining solid materials through parallel flow of combustion gases against the material in a single column kiln.

Another cbject to the present invention is to provide a calcining method for solid materials, of the above mentioned character, which will be of a very simple operation and yet of a high efficiency in the recovery of heat from the combustion gases.

One more particular object to the present invention is to provide a method of calcining solid materials, of the above mentioned nature, which will avoid the need of reversing the flow of materials and gases in the calcining and preheating zones, such as was traditional with the methods of the prior art.

One other object to the present invention is to provide a single column kiln for calcining solid materials, which will be of a very simple construction and yet of a very high efficiency for recovering the heat from the combustion gases.

One other object to the present invention is to provide a single column kiln of the above mentioned character, which will combine the preheating and calcining zones in a single column, without the need of reversing the operation of the kiln for using the preheating zone as calcining zone and viceversa.

One other object to the present invention is to provide a single column kiln of the above mentioned nature, which will maintain a precise separation between the material preheating zone and the calcining zone, effecting the preheating under countercurrent and the calcination under parallel flow without the need of reversing the flow of the gases and the material.

Another object of the present invention is to provide a single column kiln of the above mentioned character, which will provide for the constant and unreversed feed both of primary air and of secondary combustion air and which will utilize the combustion gases to be burned in a complete manner by the secondary air in order to preheat the material in a separate vertically arranged zone with respect to the calcining zone in a single column.

The foregoing objects and others ancillary thereto are preferably accomplished as follows.

In accordance to a preferred embodiment of the present invention, a method of calcining solid materials is provided to effect said calcination through a plurality of vertically arranged zones and comprising the steps of feeding said solid materials to a preheating zone wherein the materials are preheated countercurrently with combustion gases, allowing said preheated materials to fall to an air preheating zone to which primary air is fed in parallel flow with said falling preheated materials, allowing said materials to fall to a calcining zone to which fuel is admitted in parallel flow with said preheated air, allowing the thus calcined materials to fall to a cooling zone to which secondary cold air is fed countercurrently with said falling materials, exhausting the combustion gases produced in the calcining zone together with said secondary air which was preheated by the calcined materials, at a point between said calcining and cooling zones, and feeding said combustion gases and secondary air as a mixture to the preheating zone.

In another aspect of the present invention, a single column kiln for carrying out the above described process is provided, which comprises a vertical elongated housing divided into an upper or preheating chamber and a lower chamber which comprises an upper zone for preheating primary air, an intermediate zone for calcining materials and a lower zone for cooling said materials; material feed means at the top of the upper chamber; material transfer means to transfer material from the upper chamber to the lower chamber; primary air feed means at the top of the calcination zone of said lower chamber; secondary air feed means at the lower end of the cooling zone of said lower chamber; fuel injecting means at the upper end of the calcining zone of said lower chamber; gas outlet means at the lower end of said calcination zone; combustion gas feed means at the lower end of said upper chamber and communicated with said gas outlet means of the lower end of the calcining zone; and waste gas exhaust means at the upper end of said upper chamber.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments when read in connection with the accompanying drawings, in which:

DETAILED DESCRIPTION

Figure 1:
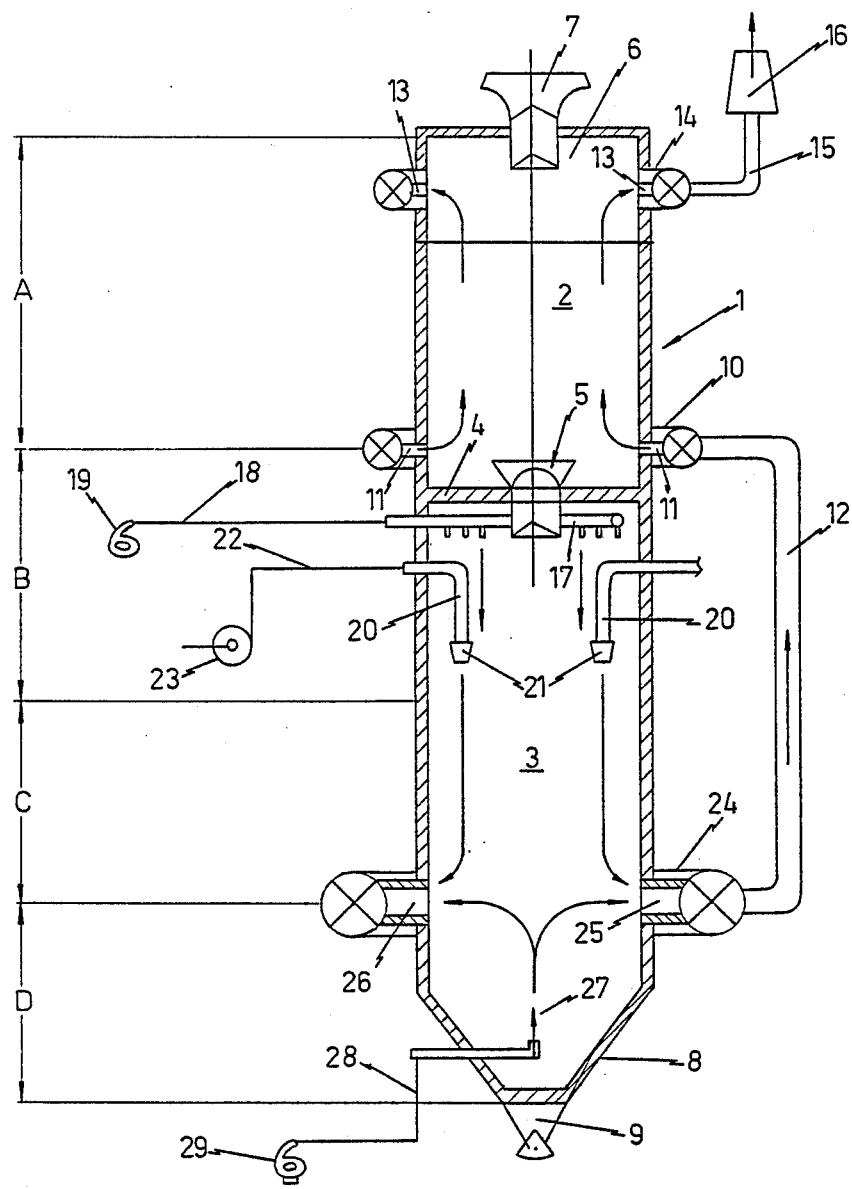
FIG. 1 is a cross sectional elevational diagrammatic view which illustrates a single column kiln for calcining solid materials, built in accordance with a particularly preferred embodiment of the present invention.

Having now more particular reference to the drawings and more specifically to FIG. 1 thereof, there is shown a preferred embodiment of a kiln construction containing one single column in accordance with the present invention, which essentially comprises a vertical elongated housing 1, divided by means of an intermediate baffle 4 into two separate chambers 2 and 3, said chambers being aligned in a single vertical draft, such as clearly illustrated in FIG. 1 of the drawings.

Chambers 2 and 3 into which the housing 1 is divided, as built in accordance with the preferred embodiment of the present invention, in turn correspond, chamber 2 to a preheating zone for solid materials designated by means of the reference character A in FIG. 1 of the drawings, and chamber 3 to three distinct zones, which are in open communication between each other within the said chamber 3, said zones being an air preheating zone designated by means of the reference character B in FIG. 1, a calcination or reaction zone C and, finally, lower zone D for cooling solid materials, said zones being established by means of the devices and for the purposes which will be described in more detail hereinbelow.

Between chamber 2 and chamber 3 of housing 1, and arranged at the baffle 4, a solid material transfer mechanism is included, designated by means of the reference numeral 5, which may be opened and closed at will from the upper end of the kiln, either mechanically or manually and which may have automatic controls for opening and closing in accordance with the level of materials within the chambers 2 and 3, and ganged in order to accomplish simultaneous opening and closing actions, with a load mechanism 7 centrally arranged on the top 6 of chamber 2, such as clearly illustrated in FIG. 1 of the drawing.

By means of the material transfer mechanism 5 and material loading mechanism 7, which may be synchronically acted for the opening and closing actions, material to be treated is loaded through the mechanism 7 into the upper chamber 2 and, at the same time, an equivalent quantity of material is transferred through the material transfer mechanism 5, from chamber 2 into chamber 3, thus passing from a position above the baffle 4 to a position below said baffle.

Correspondingly, at the bottom, which is generally conical, of the housing 1 which is designated by means of the reference numeral 8 in FIG. 1 of the drawings, a discharge mechanism 9 is provided, which may be acted upon to discharge material from the calcination kiln 1, either in a continuous or batch manner, in accordance with the operation which is desired for the kiln as will be described in more detail hereinbelow, inasmuch as said operation may be effected at will both in a continuous or in a batch manner.

The upper chamber 2 is fed with combustion gases by means of a manifold 10 which is capable of introducing combustion gases into the chamber 2 at a position in the neighborhood of its lower end, through a plurality of pipes 11 connecting the manifold 10 with the interior of said chamber 2. Manifold 10 is connected to an additional manifold 24 located at a lower position in chamber 3 in accordance with what will be described in more detail hereinafter, by means of a duct 12 which must preferably be thermally and efficiently insulated in order to avoid heat losses by radiation, given the relatively elevated temperature to which the gases are conducted in said duct toward manifold 10 through the pipes 11 to enter into chamber 2.

In the top cover 6 of chamber 2, at a point near the upper end of said chamber 2, an exhaust manifold 14 is arranged, said manifold being connected to the interior of chamber 2 by means of a plurality of pipes 13, and being also connected by means of a suitable duct 15 to a chimney or exhaust 16 to allow the escape of the spent gases, after the heat has been properly recovered, towards the atmosphere such as illustrated by means of the corresponding arrow which may be seen at the exhaust 16 in FIG. 1.

The lower chamber 3, which in accordance with what was explained above, is divided into three different zones, namely, an upper or air preheating zone B, an intermediate or calcination or reaction zone C and a lower or material cooling zone D, is provided, at its upper end, with a plurality of cold primary air inlets 17, fed by means of a line 18 from a fan or compressor 19 which drives the atmospheric cold air towards the interior of the upper end of chamber 3, for a purpose which will be more clearly seen hereinbelow, and said air inlets 17 are situated approximately at the upper end of the air preheating zone B of the lower chamber 3 of housing 1.

Approximately coinciding with the lower end of the air preheating zone B of chamber 3, a plurality of fuel lances 20 is arranged, said fuel lances being provided with suitable burner nozzle 21 which are fed from a corresponding line 22 and pump 23, with preferably a gaseous or solid fuel, to be burned using the preheated primary air as a combustion supporter, in order to establish a calcination or reaction zone C which is at an intermediate position at the chamber 3 of the housing 1 according to what may be clearly seen in FIG. 1 of the drawings.

At the lower end of the calcination or reaction zone C, outwardly of housing 1, a combustion gas and secondary air collecting manifold 24 is arranged, said manifold being connected to the interior of chamber 3 by means of a plurality of pipes 25 and 26, said manifold being in turn connected, in accordance with what was described above, through the heavily insulated duct 12, to the manifold 10 for feeding said combustion gases and secondary air into chamber 2.

At the lower end of chamber 3, coinciding with the position of the conical bottom 8, a secondary air inlet 27 is arranged, connected through line 28 with a secondary air fan or compressor 29, in order to inject cold air vertically and upwardly at the lower portion of the chamber D for cooling materials, for a purpose which will be more clearly seen in the description of the operation of the kiln built in accordance with the present invention.

Figure 2:
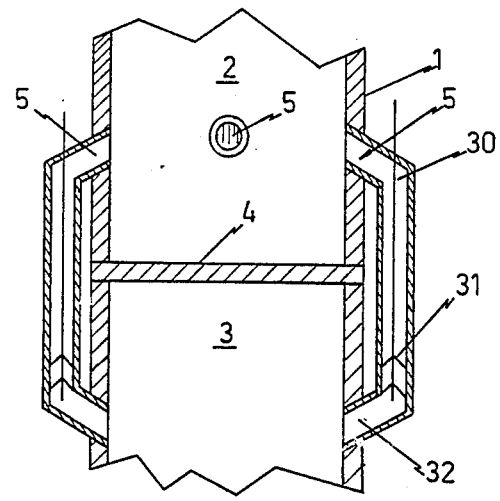
FIG. 2 is a fragmentary cross sectional elevational diagrammatic view of the zone of the single column kiln in which the materials are transferred from the preheating zone to the calcining zone and built in accordance with another embodiment of the present invention.

While the kiln illustrated in FIG. 1 constitutes the preferred embodiment of the invention, it is to be noted that the specific mechanisms shown in said figure may be modified, without thereby departing from the scope and spirit of the present invention and, therefore, such as it may be clearly seen in FIG. 2 of the drawings which illustrates the zone of the kiln which corresponds to the material transfer mechanism 5 and baffle 4, said baffle 4 in the case of the embodiment illustrated in FIG. 2 is a closed baffle, which has no material transfer mechanism 5 centrally arranged thereto, but instead said material transfer mechanism 5 is constituted by a plurality of outlet ducts 30 communicated with the interior of chamber 2 at the lower end of said chamber and which, through suitable pneumatic or manual valves 31, transfer the material to duct 32 which in turn discharges said material at the upper end of chamber 3. The effect of this type of a device is exactly the same as the effect of the transfer mechanism 5 centrally arranged to baffle 4 as illustrated in FIG. 1 of the drawings and its performance may also be synchronized with the material loading mechanism 7 and with the material discharge mechanism 9 such as was described above in connection with the kiln built in accordance with the embodiment illustrated in FIG. 1 of the drawings.

An important principle of the method and the kiln built in accordance with the present invention, is to constitute two separate chambers 2 and 3 in order that the material preheating zone and the calcining zone may be physically separated.

Figure 3:
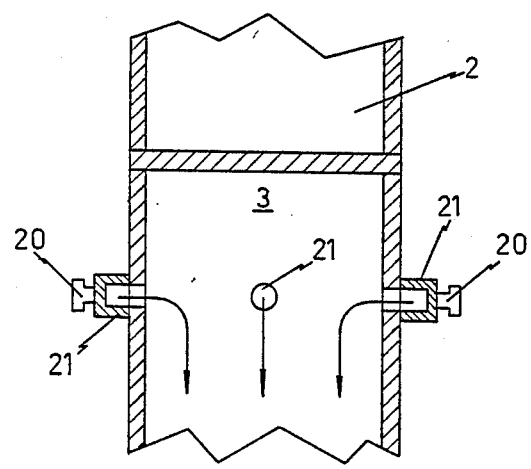
FIG. 3 is a fragmentary cross sectional elevational diagrammatic view illustrating another embodiment of the arrangement of the combustible feed means at the upper end of the calcining zone of the kiln of the present invention.

In FIG. 3 of the drawings, a different embodiment of the fuel lances 20 is illustrated, which in the particular instance of the embodiment built in accordance with FIG. 3, essentially comprise a plurality of holes 21 communicated with the interior of chamber 3 at the appropriate position, in lieu of the nozzles 21 of the fuel lances 20 of FIG. 1. The fuel lances 20, therefore, are arranged exteriorly of chamber 3 such as clearly illustrated in FIG. 3 of the drawings, whereby said lances may be replaced and/or repaired in a more expedite manner than in the embodiment shown in FIG. 1 of the drawings. The effect of said fuel lances 20, however, is exactly the same as that of the fuel lances already described in accordance with FIG. 1 whereby the modification in the design thereof does not imply any inventive change in the subject matter which is intended to protect by the present application.

The method of calcining solid materials in accordance with the present invention will be described hereinbelow in terms of the utilization of the single column kiln illustrated in FIG. 1 of the drawings, although it must be understood that said method may be effected in kilns of a different type, provided that the principle of effecting a calcination in parallel flow of the combustion gases with the materials in a single column kiln is preserved.

In accordance with a particularly preferred embodiment of the present invention, the materials to be calcined, which may preferably be limestone for the production of lime or dolomite for the production of magnesite, are charged through the loading mechanism 7 to fill up chamber 2 of housing 1. The materials are preheated in said chamber 2 in view of the flow, indicated by means of the arrows appearing in said chamber 2, of a mixture of combustion gases arriving from the calcination zone C and of secondary air arriving from the cooling zone D of housing 1, at a relatively high temperature, whereby the combustion gases from the calcination zone C are furtherly burned in chamber 2 using the secondary air injected at the lower end of the cooling zone D as will be described in more detail hereinbelow, in order to raise the temperature of the materials in chamber 2, which are thereby efficiently preheated, said materials extracting at the same time the highest proportion possible of the heat carried by the combustion gases, before permitting that the same be discharged to the atmosphere through the manifold 14 and exhaust 16.

The thusly preheated materials are transferred by means of a transfer mechanism 5 towards the lower chamber 3, said materials entering in a descending flow to the air preheating zone B, at which upper end primary air is injected through the feed nozzles 17, in order to preheat said air in parallel flow with the preheated material, until said air reaches the calcination or reaction zone C, at the upper end of which fuel is injected through the lances 20 and nozzles 21 to be burned using said primary air fed through the nozzles 17 and preheated in the zone B, in order to carry out the calcination of the preheated material, using preheated primary air and fuel, to effect the action which is required in said zone, such as the oxidation of limestone to calcium oxide or the oxidation of dolomite to magnesite.

The combustion gases which run in parallel flow with the descending materials in the calcination zone C, are opposed by a secondary air stream which is fed through nozzles 27 at the bottom of housing 1 as will be described in more detail hereinbelow, and are driven outwardly of the housing jointly with said secondary air through pipes 25 and 26 towards manifold 24 wherein the mixture of combustion gases from the calcination zone C and of preheated secondary air from the cooling zone D, pass through duct 12 to the manifold 10 and through pipes 11 into chamber 2 for being completely burned and thus preheat the material initially loaded in accordance with what was described above.

Finally, the solid material continues its descent below the manifold 24, to enter into the material cooling zone D, wherein it is cooled by means of the cold secondary air which is fed through the nozzles 27, thus preheating said secondary air at the expense of the heat absorbed from the material which is cooled, in order to feed said secondary air in mixture with the combustion gases from the calcination zone C into the material preheating chamber 2 in accordance with the above.

The materials cooled by the secondary cold air are discharged through the discharge mechanism 9, at a temperature sufficiently low for its transportation and further utilization.

As it may be seen from the above, the kiln built in accordance with the present invention is capable of carrying out the above described process either in a continuous or in a batch manner, by means of the suitable actuation of the loading and discharge mechanisms 7 and 9 of the material transfer mechanism 5 for the solid materials, as well as by the feeding (either continuous or batchwise) of the primary air by means of the fan 19 and of the secondary air by means of the fan 29, as well as of the fuel by means of pump 23, in order to carry out the process in the desired manner.

The single column kiln built in accordance with the present invention, avoids the traditional need, in the two column kilns, of interchanging the preheating zone with the calcination zone and viceversa, and of reversing the flow of gases in the kiln, which greatly facilitates the operation of the kiln itself and increases the efficiency of the process, inasmuch as in the case of the single column kiln in accordance with the present invention, the carrying out of the process is permitted in a continued manner, with a continuously descending flow of the solid materials from the top to the bottom of the column, while permitting the blow of gases in the manner clearly described above, by the provision of a definite separation between the upper or preheating chamber 2 and the lower or calcination chamber 3, and by means of the division of the latter into three different zones, namely, a preheating zone, calcining zone and material cooling zone, thereby permitting the operation of the process without the need of modifying the flow of gases within the kiln, which flow of gases is fixed with precision from the start, avoiding the necessity of direction changing baffles and other mechanisms which, when working with gases that are generally handled at very high temperatures, cause frequent disabilities and difficulties in the handing of said mechanisms.

The heat loss by radiation which could be generated from the duct 12 which bypasses the combustion gases leaving the calcination chamber and entering the preheating chamber, may be easily remedied by the provision of a suitable refractory insulation, said aspects of the invention not constituting an apparent disadvantage of the process and the kiln built in accordance with the present invention, because the provision of a suitable insulation is not an unsurmountable difficulty and of course the possible heat losses by radiation as mentioned above, do not constitute a very important feature as compared with the increase of the efficiency of the process and with the simplification of the operation of the kiln, in comparision with the very complex operation of the two column kilns presently in use and constituting the latest development related with heat recovery kilns for the calcination of solid materials, so that the kiln of the present invention may be regarded as a revolutionary apparatus in the technique of calcining solid materials, because it simplifies to a great extent the process and the operation of a kiln, and at the same time secures a highly efficient recovery of the heat carried by the combustion gases and practically no heat losses by radiation through the bypassing duct communicating the lower end of the calcination zone with the lower end of the preheating zone.

As a general rule, when the method and the kiln of the present invention are utilized for the manufacture of lime by means of the calcination of limestone, the temperature to which the limestone leaves the preheating zone A is approximately of from 800° to 900° C., whereas the temperature reached in the calcination zone C is of approximately 1100° to 1200° C., said temperatures being regulated by regulating the amounts of primary air and secondary air which are fed into the respective calcination and material cooling zones.

The material leaving the cooling zone is cooled by the secondary air down to temperatures between 50° to 60° C., inasmuch as practically the whole of the heat carried thereby is extracted by the secondary air which passes, after being admixed with the combustion gases from the calcination zone C, to the preheating zone A at temperatures which are not higher than 1000° C.

In this manner, it may be seen that the critical zones in which radiation heat losses may exist, that is, the bypassing duct 12, may be suitably insulated by virtue of the fact that the gases travel therethrough at a temperature which is not above approximately 1000° C., and a suitable refractory insulation may efficiently prevent appreciable losses of heat by radiation through the above mentioned duct 12.

On the other hand, when installing batteries of kilns of this type, which is the general case, then the bypassing duct 12 may be located between each pair of kilns, so that said duct may be housed in suitable insulated receptacles, which are constantly heated by the heat normally transmitted through the walls of the kiln by conduction, inasmuch as said bypassing ducts 12 precisely coincide with the calcination zones of the kilns and, therefore, are arranged in the places in which the kilns acquire the highest temperature.

Although certain specific embodiments of the present invention have been shown and described above, it is to be understood that many modifications thereof are possible. The present invention, therefore, is not to be restricted except insofar as is necessitated by the prior art and by the spirit of the appended claims.

What is claimed is:

1. A method of calcining solid materials which comprises the steps of feeding said solid materials at the top of a materials preheating zone, while admitting a mixture of hot combustion gases and secondary air through the bottom of said materials preheating zone in countercurrent flow with said materials; transferring the thusly preheated materials to a primary air preheating zone arranged directly and colinearly below said material preheating zone and separated therefrom by means of a partition having material transfer valve means, while admitting at a point in the vicinity of the top of said primary air preheating zone streams of primary air in co-current flow with said preheated materials; allowing said materials to descend to a calcining zone below and contiguous to said air preheating zone, while admitting at the top of said calcining zone streams of fuel in co-current flow with said preheated primary air to burn said fuel and calcine the materials in co-current flow therewith; allowing the thus calcined materials to descend to a materials cooling zone arranged directly and colinearly below said calcining zone as a downwardly extending continuation thereof, while admitting an upwardly flowing stream of secondary air at the bottom of said materials cooling zone in countercurrent flow therewith, whereby said secondary air is preheated by said materials and is admixed with the downwardly flowing combustion gases produced in the calcining zone; recycling the thus formed mixture of secondary air and combustion gases to the bottom of said materials preheating zone; and exhausting the spent gases at a point in the vicinity of the top of said materials preheating zone.

2. A method according to claim 1 wherein said solid material is limestone, said limestone being preheated in said material preheating zone to a temperature of from about 800° C. to 900° C., said material being calcined in said calcining zone at a temperature of from about 1100° C. to 1200° C., and said material being cooled in said cooling zone to a temperature of from about 50° C. to 60° C.

3. A method of calcining solid materials which comprises the step of feeding said solid materials at the top of a materials preheating zone, to permit said materials to flow down said preheating zone, introducing a mixture of combustion gases and secondary air through the bottom of said preheating zone to force them to flow upwardly and in countercurrent flow with said materials, the latter being preheated by the combustion of said combustion gases supported by said secondary air; transferring the preheated materials to a primary air preheating zone arranged directly and colinearly below said materials preheating zone and separated therefrom by a partition having a material transfer mechanism including a materials transfer valve which permits the passage of said material downwardly through said partition, injecting cold primary air at the top of said air preheating zone so that it may flow downwardly therethrough and in co-current flow with said falling preheated materials, allowing the materials to fall to a calcining zone arranged directly and colinearly with said air preheating zone as a downwardly extending continuation thereof, injecting fuel at the level defining the bottom of said air preheating zone and the top of said calcining zone, in order to burn said fuel with said preheated primary air to calcine said materials, the combustion gases thus formed calcining said falling materials in co-current flow therewith; allowing the thus calcined materials to fall to a materials cooling zone arranged directly and colinearly below said calcining zone as a downwardly extending continuation thereof, injecting cold secondary air at the bottom of said materials cooling zone to force said secondary air to flow upwardly and countercurrently with said falling materials to cool the same and to be admixed with the downwardly directed stream of combustion gases from the calcining zone; and recycling the thus formed mixture of combustion gases and secondary air to the bottom of said materials preheating zone to be thereafter exhausted to the atmosphere from the top of said materials preheating zone.

4. A single column kiln for calcining solid materials which comprises a vertical cylindrical column having a closed top, a closed bottom and an intermediate horizontal partition dividing said column into an upper or materials preheating chamber and a lower chamber, solid materials feed means at the top of said column, calcined materials discharge means at the bottom of said column, preheated materials transfer means at said partition, downwardly directed primary air injecting means arranged below said partition and at a level closely spaced therefrom, downwardly directed fuel injecting and burning means arranged at a lower level than and spaced a predetermined distance from said primary air injecting means in order to constitute a primary air preheating zone therebetween, common gas collector means arranged at a lower level than and spaced a predetermined distance from said fuel injecting and burning means to constitute a materials calcining zone which is a continuation of said primary air preheating zone, upwardly directed secondary air injecting means arranged at the bottom of said column to constitute a materials cooling zone between the level of said gas collector means and the level of said secondary air injecting means, gas duct means extending from said common gas collector means to a level immediately above said partition, and gas exhaust means at the top of said column, whereby the solid materials charged at the top of the column are preheated by the combustion and the countercurrent flow of the combustion gases generated in said calcining zone supported by the secondary air preheated in said materials cooling zone, the primary air is preheated in co-current flow with said preheated materials, the preheated materials are calcined by the burning of said fuel supported by said primary air flowing in co-current flow with said materials, and the second air is preheated by its countercurrent flow with said calcined materials which in turn are cooled to be discharged at an appropriate temperature.

5. A single column kiln, according to claim 4 wherein said preheated materials transfer means includes material transfer valve means for transferring material from the upper to the lower chamber means.

6. A single column kiln according to claim 5 wherein said materials transfer valve means comprises a chute positioned to pass through said partition means and a solid materials valve within said chute for permitting the passage of solid materials from the upper to the lower chamber means.

7. A single column kiln according to claim 5 wherein said materials transfer valve means comprises by-pass valved duct means connecting said upper and said lower chamber means to transfer material from the former to the latter.

* * * * *